United States Patent [19]

Foster et al.

[11] Patent Number: 5,320,670
[45] Date of Patent: Jun. 14, 1994

[54] SOYBEAN OIL PAINT BASE

[76] Inventors: Avis A. Foster, 70 Hancock St.; Joseph Viscione, 16 Dudley Rd., both of Lexington, Mass. 02173

[21] Appl. No.: 994,654

[22] Filed: Dec. 22, 1992

[51] Int. Cl.$^5$ .......................... C08L 91/00; C09D 4/00
[52] U.S. Cl. .................................... 106/251; 106/264; 106/266
[58] Field of Search ................ 106/266, 251, 264

[56] References Cited

U.S. PATENT DOCUMENTS

| 2,996,397 | 8/1961 | Secker, Jr. | 106/266 |
| 3,920,597 | 11/1975 | Nicks et al. | 106/266 |
| 5,167,704 | 12/1992 | Brower | 106/266 |

FOREIGN PATENT DOCUMENTS

| 403302 | 12/1990 | European Pat. Off. | |
| 60-006763 | 1/1985 | Japan | |
| 1442526 | 12/1988 | U.S.S.R. | 106/266 |

Primary Examiner—Anthony Green

[57] ABSTRACT

A bioreducible nontoxic predominantly vegetable oil paint comprising a paint base and a colorant blend is prepared which paint has a variable drying time, usually in a period of time that is longer than acrylics or watercolors but shorter than conventional oil base paints. Use of the paint is characterized by freedom from side effects caused by noxious ingredients found in conventional oil paints, ability to create the effect of either oil finished painting or watercolor and a drying time which more closely approximates the artist's application time for a single workpiece. A method making the paint and producing a watercolor-like painting from the same is disclosed.

9 Claims, No Drawings

SOYBEAN OIL PAINT BASE

BACKGROUND OF THE INVENTION

1 Field of the invention

This invention relates to a bioreducible and non-toxic vegetable oil, in particular, soybean oil paint which is capable of (i) drying in a period of time that is longer than acrylics or watercolors but shorter than conventional oil base paints, (ii) reducing noxious ingredients which cause allergic reactions, and (iii) can be applied so as to give the effect of an oil finished painting or watercolor effect, if applied thinly.

Artistis using conventional oil base paints are plagued by chronic, often severe, physical side effects to ingredients contained therein. In particular, artists often suffer ailments such as respiratory problems, headaches and skin lesions directly attributable to ingredients in paints such as turpentines, alcohols, mineral spirits, toxic fumes, heavy metals, and volatile organic compounds. These systems can be so debilitating that, for want of a feasible alternative, some artists have been forced to give up painting in a particular medium, such as oils. Still further, although these ingredients are harsh for adults, they are even worse for young adults and children.

In the past, attempts to use soy oil which is abundant and cheap, have failed because drying techniques have proven futile.

2. Description of the Prior Art

Paintings have existed in one form or another dating back to caveman days. Over time, paint products have evolved. Present day artists can choose many products including watercolor paints, acrylic paints or oil paints. Watercolors and acrylics tend to be fast drying paints. An acrylic paint placed on a palette tends to dry in about one hour after which time the artist must reapply to the palette and re-mix the color. By contrast, oil paints dry on the canvas or surface used over a much longer period of time up to six months or longer. Further, oil paints are characterized by the most noxious of ingredients, including but not limited to, turpentine, alcohol, mineral spirits and volatile organic solvent. Still further, oil paints have been "improved" by the addition of plasticizers in order to provide pliability thus preventing a painting from becoming brittle upon aging. All these "improvements", however, have added more noxious and environmentally hazardous materials to paints.

European Pat. No. 403302 discloses an oil-base artists' paint composition comprising a plasticizer, oil, a thermoplastic resin and other toxic chemicals such as, but not limited to, PVC-isobutyl ether.

Japanese Pat. No. 60006763 discloses a composition to prevent retard drying of residual oil paint, i.e., remaining on a pallet, comprising oil, plasticizer, and other toxic chemicals such as, but not limited to, butylhydroxytoluene, butyl acetate, benzene and toluene. This composition is applied over the residual paint by brushing or spraying.

Presently available paints tend to be highly toxic with strong noxious odors which frequently cause symptoms of allergic reaction such as headaches, rashes, respiratory problems, and irritated eyes. This is a particular problem for artists who sometimes work in poorly ventilated studios. Further, disposal of residual paint and paint ingredients containing PVC's, toluene, benzene and many other of the components found in present day paint, such as the two listed above, is becoming a problem to manufacturers and artists. Such disposal is highly restricted under various laws and regulations such as the Toxic Substances Control Act (TSCA) of 1976 which is enforced by the Environmental Protection Agency.

This invention produces a new paint base that maintains the quality, color depth and richness of a conventional oil base paint but reduces, if not eliminates, levels of many toxic ingredients found in conventional paints. Soybean oil is rarely used even as a trace component of conventional oil paints because it is considered a "semi- or non-drying oil". For this reason, guidebooks used by manufacturers recommend against using soybean oil for oil paints, most particularly as the predominant component. This invention provides a paint base which, when combined with a colorant and optional filler, has a drying time which more closely approximates the work time of the artist on a single painting. Such drying time allows the artists to keep the color on the palette without re-mixing over a period of time, preferably, greater than about 1 hour but less than about 10 days. The picture drying time is less than about 5 months, more preferably, about 1 month.

The invention contains ingredients which far surpass levels considered toxic for adults and children under the Guidelines established by the American Toy Manufacturers Association standards (ASTM F-963-86) pursuant to federal guidelines set out in Title 16 of the Code of Federal Regulations, Part 1000 to end, of the Consumer Product Safety Act. The paints produced when practicing the instant invention are not to be construed as child-safe or edible. They are designed to be used by artists, students and adults who wish to paint. However, the paints are so environmentally friendly, that should accidental ingestion occur, any ill effects would be drastically reduced, if not eliminated, when compared to accidental ingestion of conventional oil paints.

Further still, because the present invention dries faster than conventional oil base paints, the need for finishers, sealers and other toxic chemicals used by artists to protect the finished oil painting is eliminated. These finishers, sealers and chemicals tends to be highly toxic and often cause the colors to dull or yellow.

Still further, an artist may work on a single painting over the course of several months. Although there is no "typical" artist, a drying time for the paint on a pallet of about five to ten days is a median amount of time to allow continued work on a single painting without re-mixing. A paint which dries too quickly can necessitate frequent re-mixing often never quite the same color as the original. However, a painting which takes too long to dry will never makes its way out of the studio to the gallery wall for display. A drying time which more closely approximates an application on a single workpiece would be particularly useful as it would eliminate both extremes. Solving the problem of the drying times without compromising richness and quality on the one hand and without increasing toxic additives on the other hand has proven to be a difficult task.

None of the prior art solves the problem of providing a non-toxic, bioreducible paint or paint base which (i) is comprised predominantly of vegetable oil, more particularly soybean oil, (ii) dries within a period of at least one hour but less than 5 months, preferably 10 days, (iii) possess the quality, richness, and pliability of conventional oil base paints and (iv) reduces, if not eliminates, the odor and irritation associated with harsh chemicals, in particular, turpentine, alcohol, mineral spirits, and other volatile organic compounds.

Accordingly, it is an object of this invention to provide a relatively non-toxic and biodegradable oil paint which dries in about at least one hour but less than about 5 months.

It is a further object of this invention to prepare an oil paint using vegetable oil, more particularly, soybean oil as the predominant ingredient.

It is a further object of this invention to provide a paint base which, when mixed with a colorant blend, meets or exceeds the quality and color depth of conventional oil paints.

It is a further object of this invention to provide a paint base which when mixed with colorant blend and further thinned by a thinning medium produces a watercolor-like effect on watercolor paper.

It is yet another object of this invention to provide a method for producing a relatively non-toxic, bioreducible paint with variable drying time wherein said variability is selected for drying between about at least one hour and in less than 5 months.

SUMMARY OF THE INVENTION

Accordingly, the present invention is directed to a bioreducible nontoxic paint comprising a paint base and a colorant blend which dries between about at least one hour and in less than about 5 months wherein the paint base comprises non-drying vegetable oil, preferably soybean oil, antioxidant and dryers and the colorant blend comprises colorant and filler. The paint of the subject invention is variably drying paint wherein said variability is selected for drying between about at least one hour and in less than about 5 months, by the step of providing selected drying time determinant dryers.

DESCRIPTION OF THE PREFERRED EMBODIMENTS

This invention entails the appropriate combinations of oils, pigments, dryers, antioxidants, and fillers to accomplish the look and feel of conventional oil base paints, while reducing, if not eliminating, levels of toxic chemical to make a bioreducible vegetable oil paint base, more particularly, a soybean oil base paint. Mixtures of ingredients of conventional oil based paints simply did not work when vegetable oils, in particular soybean oil, was used as the predominant ingredient. Any paints so produced would be either too toxic or of poor quality.

In selecting the novel and appropriate combination of ingredients, the applicant desired to use a vegetable oil as it is ecologically more desirable than animal oils. Vegetable oils, usually the semi- or non-drying oils, preferably a vegetable oil, more particularly, soybean oil are used in the paint base of the instant invention. Soybean oil has the advantage of being a abundant and relatively inexpensive vegetable oil. For example, on a worldwide basis, as of the early 1980's, the various sources of "edible" oils, in terms of volume of production, rank as follows: soybeans, 50.3%; cottonseed, 16.2%; groundnuts (peanuts), 11.4%; sunflower seeds, 7.9%; rapeseed, 6.9%; copra (coconut), 2.9%; flaxseed (linseed), 1.8%; sesame seed, 1.1%; palm kernel, 0.9%: and safflower seed, 0.6%. The use of soybean oil in paints has been virtually non-existent due to its non-drying character. Accordingly, even if used as a supplemental ingredient, soybean oil has only been used in trace amounts, if at all, in conventional oil based paints. The instant invention is the first to solve the problem of using poor drying oils such as the "edible" vegetable oils, more particularly soybean oil, as the predominant ingredient of an artist's paint. Thus, the vegetable oil, in particular soybean oil, unless otherwise noted herein, is the predominant or "primary oil" in the paint of the instant invention.

During the experimentation which gave rise to the instant invention, it was discovered that vegetable oil, especially soybean oil, could be used as the predominant component of an oil base paint of the highest quality only if properly combined with effective amounts of dryers, antioxidant and colorant blends for use as artistic quality oil paints. Further, it was discovered that addition of a very small amount of a secondary oil, in particular boiled linseed, produced the superior quality paint of the instant invention.

One such superior quality paint comprises a paint base and a colorant blend. The paint base being further comprised of a primary oil, more particularly soybean oil, antioxidants, dryers and a secondary oil. The colorant blend is further comprised of colorants, more particularly pigments, and fillers. The drying time of the paint ranges from about at least one hour to about 5 months, more particularly 1-2 weeks, still more particularly about 10 days. A mixture of primary oil, dryers and pigments in the ratios of about 60%-95%:1%-5%:-5%-20%, more particularly, a ratio of 65%-75%:1.-5%-2.5%:10%-20%, respectively is highly effective when combined with other ingredients described herein for desirable properties of color retention, pliability and drying time.

The primary oil which serves as the predominant ingredient of the paint of the instant invention is a vegetable oil, usually from the class of "edible" oils, most particularly soybean oil. The proportion of primary oil is greater than 50% by weight, usually between about 60% to about 95%, more particularly about 65% to about 75%.

Suitable dryers are those which do not contain harsh turpentine and other volatile organic solvents. In particular, dryers are selected from the group of japan, oxides of manganese, cobalt, zirconium, carboxylate, calcium and mineral spirits. A selected dryer may be used alone or in combination with other dryers. The desired drying time can be adjusted according to the preference individual artist. As used in the paint of the instant invention the proportion of dryers ranges between about 1% and about 5%., more particularly, about 1.5% to about 2.5%, even more particularly 1.5% to about 1.7%.

Still further, during preparation of the composition of the instant invention, a small amount of a secondary oil is used, more particularly boiled linseed oil, can be added. The proportion of boiled linseed oil so added can range between about between about 3% and about 15%, more particularly, between about 4% and about 10%. It was discovered that when using boiled linseed oil, the pigment can more easily bond with the paint base making a superior quality and brilliant color paint.

Another component of the paint base is an antioxidant in the proportion of about 1.0% to about 2.0%, more particularly about 1.5% to about 1.75%. Any conventional antioxidants, in particular those used as anti-rancidity agent in foods and in vitamins, can be used in the present invention. Antioxidants such as butyl-P-cresol and butylated hydroxytoluene (BHT) are particularly suited for use in the instant invention.

Any conventional colorant known in the art could be used to make the look and feel of the paint of the instant invention. More particularly, colorants such as pigments, dyes or other color imparting agents are used. However, to assure that the paint is non-toxic, only organic and inorganic pigments which are far less than "heavy metal toxic levels" are selected for use. Thus only the lowest toxicity materials are used with a quality far exceeding any conventional artist's paint. Most particularly, pigments such as Napthol Red, Aylide Yellow, Carbazole Violet, Phthlocyanine Blue, Quinacridone, Azo Yellow, Napthol Red Light, Ultramarine, Burnt Umber, Burnt Sienna, Raw Umber and Raw Sienna or combinations thereof are mixed with filler and the paint base. These pigments tend to be in a dry powder form and are available through channels known to those skilled in the art. Generally, the proportion of pigment ranges from about 5% to about 20%. It should be noted that the characteristics of the pigments vary from supplier to supplier. For example, some pigments may cause the paint to have a more watery consistency. Accordingly, the viscosity of the paint can vary from watery to thick and pasty. The variation in the viscosity of the pigment can be modified by adding a filler. For purposes of this application, the colorant, more specifically the pigment, when mixed with a filler is called the colorant blend.

To achieve the desired texture, fillers such as silica or others well known in the art may be added in quantities sufficient to give the paint the preferred "body." In the preferred embodiments, a proportion of between about 4% and about 10%, more particularly about 6.9% to about 7.5%, is used. However, as the array of suitable pigments is vast and the properties of the pigments vary, percentages of filler outside these ranges are foreseeable as the amount of filler depends upon the properties of the pigments. However, the paint of the instant invention is expected to stay within the above stated proportion of paint base to colorant blend which is approximately 72%-83% to approximately 17%-28%, more particularly, approximately 80%-83% to approximately 17%-20% respectively. These ranges are approximate because the properties of pigments vary widely and effect the proportions.

An added benefit of the paint of the instant invention is that although not intended for use by children, should a child accidentally ingest the paint, the child would less likely be harmed than if the same amount of conventional oil paints were ingested. The ingredients selected, more particularly the low toxicity pigments and the "edible" vegetable oils insure that this paint is the safest oil paint known in the art.

The paint produced by this invention can be used under conditions similar to those under which oil paints can be used including, but not limited to, production and use in ambient temperature. It should be noted, however, that the composition will be rendered useless if boiled, frozen or mixed with other ingredients, such as turpentine.

In order to clarify the invention the following definitions will be used:

"Bioreducible" shall mean partially biodegradable or able to be substantially chemically broken down by bacteria and/or natural environmental factors.

"Colorant" shall mean a pigment, ink, dye or any other color imparting agent.

"Colorant blend" shall mean a combination of a colorant and an effective amount of filler that, when combined with the paint base, has the desired consistency for the artist.

"Dry" shall mean the changing of a substance from liquid state, however viscous, into a solid, fixed state.

"Dryers" shall mean chemicals which when added to a substance(s) accelerates the natural drying of that substance(s).

"Drying time determinant dryers" shall mean those dryers which, when combined with certain amounts of oil, and optionally pigments, accelerate the natural drying time of the substance to which it is added.

"Heavy metal toxic levels" shall mean levels consistent with the guidelines set by the American Toy Manufacturers Association as follows:

(a) total Lead content is 90 ppm or greater on a dry solid basis,
(b) total Cadmium, Selenium, Arsenic and Mercury content is 400 ppm or greater individually or collectively,
(c) soluble Barium is 400 ppm or greater, soluble Selenium is 400 ppm or greater, soluble Lead is 90 ppm or greater, soluble Cadmium is 60 ppm or greater, soluble Antimony is 50 ppm or greater, soluble Chromium is 50 ppm or greater, soluble Mercury is 50 ppm or greater, soluble Arsenic is 25 ppm or greater.

"Nontoxic" shall mean substances which (a) meet or surpass all government requirements for safety, (b) meet the specifications of the Hazardous Substance Act Title 16 of the Code of Federal Regulations, Part 1500.3 (c) are below heavy metal toxic levels (d) are in compliance with the American Toy Manufacturers, (e) contain very low volatile Organic compounds (V.O.C.'s), or (f) non-irritating to humans if ingested, inhaled or absorbed by the skin.

"Paint base" shall mean the combination of primary oil(s), dryers, secondary oil, and antioxidant.

"Pigments" shall mean colorants containing less than the heavy metal toxic levels.

"Primary oils" shall mean the oil which is the predominant component of the paint.

"Secondary oil" shall mean boiled linseed oil of about 15% or less by weight of the paint of the instant invention.

Generally, to prepare the paint of the instant invention, the ingredients comprising the paint base are mixed together. Thereafter the ingredients comprising the colorant blend is added to the paint base. To prepare the paint base, a primary oil, a lesser amount of a secondary oil, an antioxidant and a dryers are mixed in a 15 gallon container. This paint base is then transferred into a 50 gallon container into which the colorant blend is added. The colorant blend is comprised of a colorant, preferably a dry pigment, and a filler, preferably silica. The entire mixture is then carefully mixed then ground in a 3-roll grinding mill. This heavy bodied product has a texture which can be put into tubes. The paint is transferred into tubes by method well known in the art. Fifty pounds of the paint so mixed makes approximately 500 tubes of 1.25 fluid ounces. The artist then uses the tube of paint so prepared to make an oil painting or a water-color-look painting.

In using the paint of the instant invention to produce an oil painting, the artist places a daub of the paint onto a palette from the tube. Additional daubs, one for each color desired, are placed on the palette. The picture in progress can be worked on from palette paint which may stay open and usable for 1-2 weeks, more particularly, about 3 to about 5 days before refreshing the palette supply in order to continue with the original choice of color on the palette or picture. The painting may be wet and workable for several days and will be dry to touch in about 10 days or less.

In using the paint of the instant invention to create a watercolor-look painting, the artist takes the paint of the instant invention and further dilutes it with a specially prepared medium. No other oil paint is known in the art which can be used successfully as a watercolor-look alike. Conventional oil paints when diluted do not hold their color and streak on the painting. Although the vegetable oil paint of the instant invention can be thinned, the soybean oil paint has been found to have the highest quality and is preferred. The quality and intensity of the pigment is such that the density of hue is still strong compared to the conventional oil paints. Conventional oil paints must be diluted with noxious turpentine which makes streaks on watercolor paper. The medium is a conventional medium such as a mixture comprising aromatic hydrocarbons (approximately 100 O.S.H.A. pel), aliphatic hydrocarbons (approximately 500 O.S.H.A. pel), and trimethyl benzene (approximately O.S.H.A. 10%) into which a small amount of vegetable oil, more particularly soybean oil, has been added. Only a small amount, more particularly less than approximately 5 ml is needed to make a medium effective with the paint of the instant invention.

The following examples illustrate the advantages of the paint of the instant invention and the method of making the same. The mixing of several different combinations and the drying time of each is indicated. Notes on the texture, pliability, and tackiness are included in the Examples. The examples are provided for the purpose of illustration and are not meant to be limiting. All values expressed in parts or percents are by weight unless otherwise indicated.

EXAMPLE 1

In a particularly excellent paint, the applicant prepared 50 pounds of pure violet. First, 37.5 pounds of soybean oil and 2.25 pounds of boiled linseed oil, 0.75 pounds of Japan, and 0.75 pounds of butyl-P-cresol are mixed in a 15 gallon container and stirred or mixed by machine. Then 5 pounds of dry Carbazole Violet pigment is added to the above and 3.75 pounds of silica are all blended together. Thereafter, the entire mixture is put into a 3-roll grinding mill to be ground so the concentration of color is intensified while all the ingredients are blended evenly. The blended mixture is then transferred into tubes by a method well known in the art. Fifty pounds of the paint so mixed makes approximately 500 tubes of 1.25 fluid ounces of artist's paint.

The paint so prepared is tested for its quality and drying time. The violet paint is compared visually to commercially available conventional oil paints which were used as the controls. Test painting were made by artists. A daub is placed on a palette and used on a conventional canvas. Both the daub on the palette and the paint on the canvas are tested for tackiness every day for 7 days. The daub on the palette stayed usable without losing any of its quality or pliability for 10 days. No skin formed at any time nor did the daub become hard or shows signs of cracking on the palette. The paint being tested is workable on the canvas without the addition of any other chemicals or paints for 2 days. The paint of the canvas dried fully in 3 weeks without becoming brittle or dull. Further, the color, luster, hue, body and oiliness of the paint being tested far exceeded the same qualities in the controls.

EXAMPLE 2

The same ingredients as in Example 1 are combined except 5 pounds of Aylide Yellow is substituted for the 5 pounds of Carbazole Violet. The paint was tested by artists on a conventional canvas. The superior character or the paint and the drying times corresponded to those in Example 1. Also, the resulting paint was similarly compared to a conventional Yellow oil base paint. The color, luster, hue, body and oiliness of the paint in this Example far exceeded the same qualities in the conventional paint.

EXAMPLES 3 and 4

The same ingredients as in Example 1 are combined except 5 pounds of Naphthol Red (Example 3) and Black (Example 4) pigments, respectively, are substituted for Carbazole Violet. The paint was tested by artists on a conventional canvas. The superior character or the paint and the drying times corresponded to those in Example 1. Also, the resulting paints were similarly compared to their corresponding colors of conventional oil base paint. The color, luster, hue, body and oiliness of the paint in these Examples far exceeded the same qualities in the conventional paints.

EXAMPLE 5

In another particularly excellent paint, the applicant prepared 50 pounds of Titanium White. First, 37.5 pounds of soybean oil and 2.25 pounds of boiled linseed oil, 0.75 pounds of Japan, and 0.75 pounds of antioxidant are mixed in a 15 gallon container and stirred or mixed by machine. Then 5 pounds of dry white pigment is added to the above and 3.75 pounds of silica are all blended together. Thereafter, the entire mixture is put into a 3-roll grinding mill to be ground so the concentration of color is intensified while all the ingredients are blended evenly. The blended mixture is then transferred into tubes by a method well known in the art. Fifty pounds of the paint so mixed makes approximately 500 tubes of 1.25 fluid ounces of artist's paint.

The paint so prepared is tested for its quality and drying time. The Titanium White is compared visually to commercially available conventional oil paints which were used as the controls. Test painting were made by artists. A daub is placed on a palette and used on a conventional canvas. Both the daub on the palette and the paint on the canvas are tested for tackiness every day for 7 days. The daub on the palette stayed usable without losing any of its quality or pliability for 10 days. No skin formed at any time nor did the daub become hard or shows signs of cracking on the palette. The paint being tested is workable on the canvas without the addition of any other chemicals or paints for 2 days. The paint of the canvas dried fully in 3 weeks without becoming brittle or dull. Further, the color, luster, hue, body and oiliness of the paint being tested met or exceeded the same qualities in the controls.

EXAMPLE 6

In another desirable paint, the applicant prepared 50 pounds of Titanium White. This paint, while good and perfectly acceptable, did not achieve the same excellent test results as that in Example 5. The same steps are followed as in Example 5 and the same amount and proportions of pigment, filler, boiled linseed oil and soybean oil are used. The type and proportion of the dryers and antioxidant are changed as follows: Instead of 0.75 pounds of Japan, 0.5 pounds of a combined Cobalt and Manganese dryer plus 0.5 pounds of Manganese are used as dryers. Further, instead of 0.75 pounds of antioxidant, 0.5 pounds of the same antioxidant are used. Approximately 500 tubes of 1.25 fluid ounces of Titanium White are produced.

The paint so prepared are tested for its quality and drying time. The Titanium White are compared visually to the paint of Example 5 and to commercially available conventional oil paints as controls. Test painting were made by artists. A daub is placed on a palette and used on a conventional canvas. Both the daub on the palette and the paint on the canvas are tested for tackiness every day for 10 days. The daub on the palette stayed usable without losing any of its quality or pliability for 10 days. No skin formed at any time nor did the daub become hard or shows signs of cracking on the palette. The paint being tested is workable on the canvas without the addition of any other chemicals or paints for 3 days. The paint of the canvas dried fully in 5 weeks without becoming brittle or dull. Further, the color, luster, hue, body and oiliness of the paint being tested met or exceeded the same qualities in the conventional oil paints. The quality, texture and hue is good but less striking than the quality texture, and hue of the paint of Example 5.

EXAMPLE 7

In another desirable paint, the applicant prepared 50 pounds of Titanium White. This paint, while good and perfectly acceptable, was not as good as either the test results in Example 5 or Example 6. The same steps are followed and the same amount and proportions of pigment, filler, boiled linseed oil and vegetable oil are used. The type and proportion of the dryers and antioxidant are changed as follows: Instead of 0.75 pounds of Japan, 0.5 pounds of a combined Cobalt and Manganese dryer plus 0.5 pounds of Manganese are used as dryers. Further, instead of 0.75 pounds of antioxidant, 0.5 pounds of the same antioxidant are used. Approximately 500 tubes of 1.25 fluid ounces of Titanium White are produced. The paint so prepared are tested for its quality and drying time. The Titanium White are compared visually to commercially available conventional oil paints as controls. Test painting were made by artists. A daub is placed on a palette and used on a conventional canvas. Both the daub on the palette and the paint on the canvas are tested for tackiness every day for 10 days. The daub on the palette stayed usable without losing any of its quality or pliability for 10 days. No skin formed at any time nor did the daub become hard or shows signs of cracking on the palette. The paint being tested is workable on the canvas without the addition of any other chemicals or paints for 3 days. The paint of the canvas dried fully in 5 weeks without becoming brittle or dull. Further, the color, luster, hue, body and oiliness of the paint being tested met or exceeded the same qualities in the conventional oil paints. The quality, texture and hue is good but less striking than the quality texture, and hue of the paints of the other Examples.

EXAMPLE 8

A watercolor-look painting is produced by takes the paint of the instant invention and further dilutes it with a specially prepared medium. The paint ingredients of soybean oil in the proportion 75%, boiled linseed oil in the proportion 4.5%, drying time determinant dryers in the proportion 1.5%, antioxidant in the proportion 1.5%, a colorant in the proportion 10% and silica in the proportion 7.5%; are mixed with a diluting medium. The diluting medium comprises aromatic hydrocarbons (100 O. S.H.A. pel), aliphatic hydrocarbons (500 O.S.-H.A. pel), and trimethyl benzene (O.S.H.A. 10%) and 5 ml. of soybean oil. The paint is now thinned and is applied onto conventional watercolor paper. The quality and intensity of the color is compared to the density of hue of conventional oil paints diluted with turpentine. The quality and hue of the color of the paint so thinned is very strong and did not streak. Also, the conventional paints are weak and streak on watercolor paper.

What is claimed is:
1. A bioreducible nontoxic artist's paint comprising:
between about 50% to 90% of a primary vegetable oil selected from the group consisting of soybean oil, cottonseed oil, groundnut oil, peanut oil, sunflower oil, rapeseed oil, coconut oil, sesame seed oil, palm kernel oil, corn oil and safflower oil;
between about 1% and about 5% dryers selected from the group consisting of japan, oxides of maganese, oxides of cobalt and combinations of oxides of magnanese and cobalt;
between about 3% and about 15% boiled linseed oil;
between about 0.75% and 2% antioxidant selected from the group consisting of butyl-P-cresol and butylated hydroxytoluene (BHT);
between about 5% and about 20% dry pigment, said pigment containing metal levels below heavy metal toxic level; and
between about 4% and about 10% silica and wherein said paint dries between about at least one hour and in less than about 5 months.
2. The paint of claim 1 which dries on a pallet between about 5 to about 10 days.
3. The paint of claim 1 which dries on a canvas between about 2 days and about 5 weeks.
4. The paint of claim 1 wherein said vegetable oil comprises soybean oil in the proportion between at least about 60% to about 80%.
5. The paint of claim 1 wherein said metal levels which are below heavy metal toxic levels consist of:
(a) a total Lead content below 90 ppm on a dry solid basis,
(b) a total Cadmium, Selenium, Arsenic and Mercury content below 400 ppm individually or collectively,
(c) soluble Barium below 400 ppm, soluble Selenium below 400 ppm, soluble Lead below 90 ppm, soluble Cadmium below 60 ppm, soluble Antimony below 50 ppm, soluble Chromium below 50 ppm, soluble Mercury below 50 ppm, soluble Arsenic below 25 ppm.
6. A method of preparing a variably drying paint with a drying time of between about at least one hour and in less than about 5 months, comprising:
(a) providing the following ingredients
between about 50% to 90% of a primary vegetable oil selected from the group consisting of soybean oil, cotton seed oil, groundnut oil, peanut oil, sunflower oil, rapeseed oil, coconut oil, sesame seed oil, palm kernel oil, corn oil and safflower oil; between about 1% and about 5% dryers selected from the group consisting of japan, oxides of man- ganese, oxides of cobalt and combinations of oxides of manganese and cobalt; between about 3% and about 15% boiled linseed oil; between about 0.75% and 2% antioxidant selected from the group consisting of butyl-P-cresol and butylated hydroxytoluene (BHT); between about 5% and about 20% dry pigment containing metal levels below heavy metal toxic level; between about 4% and about 10% silica;

(b) blending the ingredients of step (a);

(c) taking the blended ingredients of step (b) and grinding in a 3-roll grinding mill to produce an evenly blended paint mixture; and (d) packaging the evenly blended paint mixture of step (c) into tubes.

7. The method of claim 6 wherein the drying time is about 30 to about 90 days.

8. The method of claim 6 wherein the drying time is about 10 days.

9. A method of producing a painting comprising:

(a) providing the following ingredients: between about 50% to 90% of a primary vegetable oil selected from the group consisting of soybean oil, cottonseed oil, groundnut oil, peanut oil, sunflower oil, rapeseed oil, coconut oil, sesame seed oil, palm kernel oil, corn oil and safflower oil; between about 1% and about 5% dryers selected from the group consisting of japan, oxides of manganese, oxides of cobalt and combinations of oxides of manganese and cobalt; between about 3% and about 15% boiled linseed oil; between about 0.75% and 2% antioxidant selected from the group consisting of butyl-P-cresol and butylated hydroxytoluene (BHT); between about 5% and about 20% dry pigment containing metal levels below heavy metal toxic level; between about 4% and about 10% silica;

(b) combining the ingredients of step (a) with a mixture of aromatic hydrocarbons, aliphatic hydrocarbons, trimethyl benzene and soybean oil to produce thinned paint; and (c) applying the thinned paint of step (b) onto conventional watercolor paper producing a watercolor effect.

* * * * *